United States Patent
Ayoub et al.

(10) Patent No.: US 6,632,778 B1
(45) Date of Patent: Oct. 14, 2003

(54) SELF-DIVERTING RESIN SYSTEMS FOR SAND CONSOLIDATION

(75) Inventors: Joseph A. Ayoub, Katy, TX (US); John P. Crawshaw, Newmarket (GB); Paul W. Way, Little Shelford (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/563,223

(22) Filed: May 2, 2000

(51) Int. Cl.$^7$ .................................................. C09K 3/00
(52) U.S. Cl. ......................................... 507/202; 516/13
(58) Field of Search ................................ 507/102, 202; 166/295; 516/13

(56) References Cited

U.S. PATENT DOCUMENTS

| | | | |
|---|---|---|---|
| 4,000,781 A | | 1/1977 | Knapp |
| 4,291,766 A | | 9/1981 | Davies |
| 4,427,069 A | | 1/1984 | Friedman |
| 4,669,543 A | | 6/1987 | Young |
| 4,891,072 A | | 1/1990 | Cooper |
| 5,010,953 A | | 4/1991 | Friedman et al. |
| 5,199,492 A | | 4/1993 | Surles |
| 5,360,558 A | * | 11/1994 | Pakulski et al. ............. 507/202 |
| 5,363,917 A | | 11/1994 | Jennings |
| 5,472,987 A | * | 12/1995 | Reedy et al. ................. 516/13 |
| 5,513,712 A | * | 5/1996 | Sydansk ..................... 507/102 |
| 5,567,088 A | | 10/1996 | Shotts |
| 5,791,415 A | | 8/1998 | Nguyen |
| 5,806,593 A | | 9/1998 | Surles |
| 5,830,970 A | * | 11/1998 | Cobb et al. .................... 516/13 |
| 5,875,844 A | | 3/1999 | Chatterji |
| 6,059,036 A | * | 5/2000 | Chatterji et al. ............ 507/202 |
| 6,069,117 A | * | 5/2000 | Onan et al. ................. 507/202 |
| 6,268,314 B1 | * | 7/2001 | Hughes et al. .............. 507/202 |

FOREIGN PATENT DOCUMENTS

| | | |
|---|---|---|
| GB | 1 133 235 | 11/1968 |
| GB | 1 511 589 | 5/1978 |
| GB | 2 022 653 | 12/1979 |
| GB | 2 259 724 | 3/1993 |
| WO | WO98/53180 | 11/1998 |

* cited by examiner

*Primary Examiner*—Philip Tucker
(74) *Attorney, Agent, or Firm*—Stephen Schlather; Catherine Menes; Brigitte Jeffery

(57) ABSTRACT

Herein is described a fluid that is useful in consolidating a formation without the use of a gravel pack and screen. In particular, the fluid is useful in consolidating heterogeneous formations where the permeability is not uniform over-the total formation thickness, e.g. a formation having at least a first layer and a second layer, wherein the permeability of the first layer is greater than that of the second layer. The fluid comprises at least one of a resin, a curing agent, and a surfactant, wherein the fluid is self-diverting. Optionally, a catalyst or other additives, such as an oil wetting agent, can be used.

Fluids of the present invention are self-diverting, i.e. in a formation comprising at least a first layer and a second layer, wherein the first layer has a higher permeability than the second layer, the depth of penetration of the fluid into the second layer will be greater than that predicted from the permeability ratio (the ratio of the permeability of the first layer to that of the second layer). Self-diversion can be achieved by structuring the fluid by incorporation of another phase, either liquid or gas, or by using an additive in the fluid.

Also disclosed are methods for using such a fluid to consolidate a formation, especially a heterogeneous formation.

6 Claims, No Drawings

SELF-DIVERTING RESIN SYSTEMS FOR SAND CONSOLIDATION

TECHNICAL FIELD OF THE INVENTION

This Invention relates to the consolidation of hydrocarbon-bearing rock formations to minimize flow of particulates into a wellbore, and in particular to fluids and methods for consolidation of formations comprising at least two layers which differ in permeability.

BACKGROUND OF THE INVENTION

Hydrocarbons (oil, natural gas, etc.) are obtained from a subterranean geologic formation (i.e., a "reservoir") by drilling a well that penetrates the hydrocarbon-bearing formation. This provides a partial flowpath for the hydrocarbon to reach the surface. In order for the hydrocarbon to be "produced," that is travel from the formation to the wellbore (and ultimately to the surface), there must be a sufficiently unimpeded flowpath from the formation to the wellbore. This flowpath is through the formation rock—e.g., sandstone, carbonates—which has pores of sufficient size, connectivity, and number to provide a conduit for the hydrocarbon to move through the formation.

When hydrocarbon is produced from a well, small particulates present in the formation may travel with the hydrocarbon from the formation, through the wellbore, to the surface. The presence of small particulates is especially likely in soft formations comprising sand, sandstone, or limestone. The travel of small particulates with the hydrocarbon is undesirable. Small particulates flowing through the wellbore will erode equipment in the wellbore and at the surface, which can make replacement of such equipment necessary. Small particulates in the produced hydrocarbon must also be removed before the hydrocarbon can be processed. Also, small particulates can come to reside in the wellbore to the point where hydrocarbon production is greatly diminished or completely stopped.

One approach to minimize flow of small particulates into the wellbore is by the use of a gravel pack. A screen is placed around the wellbore casing. To the outside of the screen and around the screened wellbore casing is placed a gravel pack. As hydrocarbons are produced from the formation, they travel through the gravel pack and the screen before entering the wellbore. The gravel pack and screen inhibit the flow of small particulates but, under normal conditions, do not substantially inhibit the production of hydrocarbons. However, placing a gravel pack and screen requires specialized equipment, and the gravel pack and screen create a mechanical restriction which may be plugged by scale or may be eroded by the flow of small particulates. It is desirable to have a method for completing wells in unconsolidated formations that does not involve the use of a gravel pack and screen.

Another approach involves consolidating the formation by injecting a fluid comprising a resin or epoxy. Conventional consolidating fluids, such as Sandlock™ (Schlumberger), comprise a resin, and optionally a curing agent, a catalyst, and an oil wetting agent. When injected into the formation, the resin (acted upon by the curing agent and catalyst, if present) sets, causing consolidation of the formation and reduction in the concentration of small particulates. Consolidating fluids and methods for their use are reported in U.S. Pat. Nos. 5,806,593; 5,199,492; 4,669,543; 4,427,069; and 4,291,766.

However, conventional fluids have a number of disadvantages. Because the fluids have relatively long setting times, they readily flow into regions of the formation which have already received a sufficient amount of the fluid (passage of least resistance). As a result, the length of wellbore that can be treated in a single application is limited to less than about 40 feet (10 m).

Also, a disadvantage is seen in consolidation of heterogeneous formations, e.g. formations which comprise at least a first layer and a second layer, wherein the first layer has a greater permeability than the second layer (e.g. the ratio of the permeability of the first layer to the permeability of the second layer, which may herein be termed the "permeability ratio," is greater than 1). The greater permeability of the first layer allows the consolidating fluid to more readily penetrate the first layer. As a result, after the consolidating fluid enters the formation and sets, the first layer is highly consolidated, but the second layer is consolidated only to a very minor extent, if at all.

Therefore, if a formation is heterogeneous, e.g. the formation comprises at least a first layer and a second layer, a need exists for consolidating fluids that are capable of consolidating both the first layer and the second layer in a single application. Preferably, such consolidating fluids are "self-diverting," as defined below.

A number of well treatment fluids, including consolidating fluids, comprising either an emulsion or a foam are known. U.S. Pat. No. 5,363,917 teaches a foamed consolidating fluid which can support combustion of hydrocarbons in the formation. Products of the hydrocarbon combustion consolidate the formation.

U.S. Pat. Nos. 5,010,953 and 5,567,088 disclose a consolidating fluid provided as an aerosol in steam. The former patent teaches that steam maintains void spaces in the formation during setting of a polymerizable compound, e.g. furfuryl alcohol.

Published PCT application WO 98/53180 teaches emulsions comprising at least two discontinuous phases comprising a gelling polymer, such as a polysaccharide, in one phase and an inorganic or organic crosslinker in another.

Great Britain Patent No. 2 022 653 teaches water-in-oil-in-water emulsions for matrix acidizing operations. In one teaching, particles are present in the internal water phase and the acid is present in the external water phase. In use, the particles plug pore spaces in the formation and divert acid to other regions of the formation. In another teaching, the acid is present in the internal water phase, which in use will strip out in narrow pore throats where acidizing is most effective.

SUMMARY OF THE INVENTION

The present invention relates to the use of self-diverting fluids in consolidating operations. As used herein, the term "diverting" means that, in a subterranean formation comprising at least a first layer and a second layer, wherein the first layer has a higher permeability than the second layer, sand production from the formation will be less than when a conventional, non-diverting fluid is used. Though not to be bound by theory, it is believed that the depth to which the self-diverting fluid enters the second layer will be greater than that predicted from the permeability ratio. For an example, if the permeability ratio is 4:1, an observation of reduced sand production occurs presumably if the depth of penetration in the second layer is greater than 20% of that in the first layer. "Self-diverting" means that the diversion is a property of the consolidating fluid itself, and no additional fluid or procedure is required to achieve it.

Preferably, self-diversion leads to a reduction in sand production of at least about 10% relative to known consolidating fluids, more preferably at least about 20%, most preferably at least about 30%. The upper limit on reduction of sand production would be reached when, presumably, depth of penetration is substantially equal in each layer of the formation, and would be observed as very little sand production from the formation.

The self-diversion can be obtained by structuring the fluid by incorporation of another phase, either liquid or gas. Also, additives can be used to prevent at least one of the active ingredients of the consolidating fluid from interacting with the other active ingredients until the fluid is forced into the porous medium, at which point consolidation and reduction of the formation mobility occurs simultaneously. However self-diversion is brought about, the result is increased resistance for continuing fluid flow into the area treated, and consequent divergence of flow into other layers of the formation which are then treated adequately.

In most embodiments, the present invention is directed to a consolidating fluid comprising a resin, a curing agent, and a surfactant or surfactants. Optionally, the consolidating fluid can comprise a catalyst, an oil-wetting agent, a coupling agent, or any combination thereof.

The resin can be any resin known to be useful in consolidation of a subterranean formation. The resin can comprise a furan, a polyurethane, or an epichlorohydrin polymer. (By "resin comprising a polyurethane" is meant a resin comprising low molecular weight polymers of polyether, aliphatic polyester, or polybutadiene that generate the polyurethane upon setting). Preferably, the resin comprises bisphenol A-epichlorohydrin polymer.

The curing agent can be any agent known to promote setting of the resin under the pressure and temperature conditions found in the subterranean formation. If the resin comprises bisphenol A-epichlorohydrin polymer, preferably, the curing agent comprises 4,4-methylenedianlline. If the resin comprises a polyurethane as defined above, the curing agent is preferably a diisocyanate. On the other hand, if the resin is a furan, a curing agent is optional, as furans are capable of autopolymerization.

The catalyst, if used, can be any compound known to promote the activity of the curing agent to set the resin under the pressure and temperature conditions found in the subterranean formation. In the embodiment comprising bisphenol A-epichlorohydrin resin and 4,4-methylenedianlline curing agent, preferably, the catalyst comprises an amine phenol derivative. Alternatively, if no curing agent is needed (as in the case of the resin comprising a furan), the catalyst can promote autopolymerization of the resin. For instance, if the resin comprises a furan, the catalyst preferably comprises an acid catalyst, such as toluene sulfonic acid, hydrochloric acid, sulfuric acid, HNO, oxalic acid, HI, maleic acid, chloroacetic acid, dichloroacetic acid, trichloroacetic acid, $H_3PO_4$, o-nitrobenzoic acid, benzoic acid, acetic acid, or adipic acid.

The resin, curing agent, and optional catalyst can each comprise additional compounds known to be useful in the production, storage, or processing of the active ingredients. For example, if the resin comprises an epichlorohydrin polymer, the resin can also comprise about 30–40% by weight 2-(2-methoxyethoxy)ethanol and about 1–5% xylene. On the other hand, if the resin comprises a furan, the resin can also comprise butyl acetate or furfuryl acetate as a solvent to reduce viscosity and remove water generated by the condensation of the furan. The curing agent, for example, can comprise about 30–40% by weight 2-(2-methoxyethoxy)ethanol and about 10% by weight glycidoxypropyl trimethoxysilane. The catalyst can comprise about 16% phenol. Other additives can be present as well. A particularly useful additive is an oil wetting surfactant. Another useful additive is a coupling agent, such as a silane.

A preferred resin/curing agent/catalyst system that can be used in the present invention is commercially available under the tradename Sandlock™ (Schlumberger).

The surfactant can be, for example, a siloxane; a polysiloxane; a polyether-modified polysiloxane such as Tegostab (T.H. Goldschmidt ltd.); a water soluble, high hydrophilicalipophilic balance (HLB) emulsifier such as polyoxyethylene sorbitan monopalmitate (Tween 40, ICI), sorbitan esters (a mixture of which is commercially available as Tween 80, Imperial Chemical Industries (ICI)), block copolymers of ethylene oxide (such as Synperonic PE/F127, ICI), polyoxyethylene lauryl ether (Brij 35, ICI), PEG-25 soya sterol (Brij 58, ICI), or alkylamine ethoxylate (Triton X100, Union Carbide); or a water soluble, low HLB emulsifier such as sorbitan sesquioleate (Span 80, ICI), lecithin, polymeric polyesters (such as Hypomer A60, ICI), or polysiloxane polyalkyl/polyether copolymer (Abil EM90, T.H. Goldschmidt ltd.). "High" HLB is hereby defined as having a hydrophilicity to lipophilicity ratio of greater than 1, and "low" HLB is hereby defined as having this ratio of less than 1.

A preferred embodiment of the invention is a consolidating fluid composition comprising a resin, a curing agent, a surfactant, and at least 70% by volume of a gas. The fluid can also comprise a catalyst or other additives, such as an oil-wetting agent. Preferably, the oil-wetting agent is a mixture of propan-2-ol and a polyglycol amine derivative, such as is available commercially in the Sandlock system from Schlumberger.

The resin, the curing agent, the catalyst, and other additives, if any, are as described above. In this embodiment, any surfactant capable of allowing sufficient foaming of the fluid (i.e. at least about 50%, preferably about 70%, gas by volume under 1 atm pressure and about 20–40° C.) can be used in the consolidating fluid. Preferably, the surfactant comprises a polyether-modified polysiloxane, such as a polysiloxane backbone with polyether side chains, as is commercially available under the name Tegostab B8404 (Goldschmidt). The polyether side chains may be, for example, polyethylene oxide or polypropylene oxide; however, any other polyether side chain is within the scope of the present invention.

In another preferred embodiment, the present invention is directed to a consolidating fluid comprising an oil-in-water-in-oil emulsion, wherein the internal oil phase comprises a catalyst and a resin, the water phase separates the two oil phases, and the external oil phase comprises a curing agent; wherein the emulsion further comprises a water soluble, high HLB emulsifier and a water soluble, low HLB emulsifier. The consolidating fluid can also comprise other additives, such as an oil-wetting agent. Alternatively, the resin can be present in the external oil phase.

The catalyst, resin, and curing agent are as described above. The water soluble, high HLB emulsifier can be selected, for example, from Tween 40, Tween 80, Synperonic PE/F127, Brij 35, Brij 58, or Triton X100. The water soluble, low HLB emulsifier can be selected, for example, from Span 80, lecithin, Hypomer A60, or Abil EM90. Preferably, the high HLB emulsifier is Tween 80, and the low HLB emulsifier is Hypomer A60.

In a further embodiment, the present invention is directed to a method of consolidating a formation, comprising providing a consolidating fluid according to an embodiment described above, and injecting the fluid into the formation. The method is especially suited for consolidating a heterogeneous formation, e.g. a formation comprising at least a first layer and a second layer, wherein the first layer has a greater permeability than the second layer (the ratio of the permeability of the first layer to the permeability of the second layer is greater than 1).

Detailed Description of Preferred Embodiments
Components of the Consolidation Fluid While the compositions of the present invention are described herein as comprising certain materials, it should be understood that the compositions can optionally comprise two or more chemically different such materials. For example, a composition could comprise a mixture of two or more resins, curing agents, catalysts, emulsifiers, or surfactants, provided that the compounds chosen for the mixture are compatible with the intended use of the composition as a consolidating fluid.

In all embodiments, the compositions comprise a resin. The active ingredient in the resin, after injection and setting, adheres small particulates in a subterranean formation together or to fixed structures within the formation.

The resin can be any resin known to be useful in consolidation of a formation. For example, the resin can comprise a furan, a polyurethane, or an epichlorohydrin polymer. A preferred resin comprises bisphenol A-epichlorohydrin polymer, preferably at least about 60% of the resin by weight. The resin can also comprise other compounds, such as 2-(2-methoxyethoxy)ethanol (in many embodiments, preferably between about 30% and about 40% of the resin by weight) or xylene (in many embodiments, preferably between about 1% and about 5% of the resin by weight), which are useful as diluents to reduce the viscosity of the polymer.

In most embodiments, the compositions of the present invention also comprise a curing agent, unless the resin comprises a furan, in which case the curing agent is optional. The active ingredient in the curing agent promotes setting of the resin.

The curing agent can be any curing agent known to be useful in promoting setting of the selected resin. If the resin comprises bisphenol A-epichlorohydrin polymer, a preferred curing agent comprises 4,4-methylenedianlline, preferably at least about 50% of the curing agent by weight. To reduce the viscosity of the curing agent, the curing agent can also comprise a diluent, such as 2-(2-methoxyethoxy)ethanol, xylene, or mixtures thereof (preferably between about 30% and about 40% by weight of the curing agent). To promote setting even further, the curing agent can also comprise a silane coupling agent, such as glycidoxypropyl trimethoxysilane (preferably about 10% by weight of the curing agent).

In all embodiments, the compositions of the present invention can also comprise a catalyst. The presence of the catalyst is usually optional, but may be required in certain embodiments, as will be described below. The active ingredient in the catalyst accelerates the setting of the resin, especially at low temperatures, such as below about 100° C. The presence of a catalyst may not be required in consolidating fluids for use in higher temperature formations (e.g. greater than about 100° C.), where the speed of setting is adequate in the absence of catalyst.

If used to promote setting of a resin comprising an epichlorohydrin, preferably the catalyst comprises an amine phenol derivative, preferably at least about 80% of the catalyst by weight. By "amine phenol derivative" is meant a phenol substituted with a nitrogen-containing group, wherein the substituted phenol is capable of accelerating the setting rate of the resin in the presence of the curing agent. An exemplary amine phenol derivative is dimethylaminomethyl-substituted phenol. The catalyst can also comprise a diluent, such as phenol.

If the resin comprises a furan, inclusion of the catalyst is strongly preferred to promote autopolymerization of the furan. Preferably, the catalyst comprises an acid catalyst, such as toluene sulfonic acid, hydrochloric acid, sulfuric acid, HNO, oxalic acid, HI, maleic acid, chloroacetic acid, dichloroacetic acid, trichloroacetic acid, $H_3PO_4$, o-nitrobenzoic acid, benzoic acid, acetic acid, or adipic acid.

In all embodiments, the consolidating fluid can also comprise an oil-wetting surfactant. Preferably, the oil-wetting agent is a mixture of propan-2-ol and a polyglycol amine derivative. The oil-wetting surfactant allows the resin to bind to the surface of small particulates, e.g. sand grains, which may be water-wet. Also, other additives known in the art can be used, provided they do not interfere with the self-diverting properties of the consolidating fluid.

In all embodiments, the consolidating fluid can also comprise a coupling agent. Preferably, the coupling agent is a silane. The coupling agent reacts chemically with both the small particulates and the resin, forming covalent bonds across the interface and minimizing the diffusion of water-along the sand-resin interface.

In one preferred embodiment, the consolidating fluid comprises a resin, a curing agent, a surfactant, and at least about 50%, preferably at least about 70%, by volume of a gas. This embodiment may be referred to herein as a "foamed composition," by which is meant that the fluid has passed through a foam generator. The fluid can also comprise a catalyst, an oil-wetting agent, a coupling agent, or any combination thereof. The resin, curing agent, and optional catalyst, coupling agent, and oil-wetting agent are as described above.

The surfactant functions to allow entry of the gas volume into the fluid (i.e. foaming of the fluid). The surfactant can be any surfactant capable of allowing sufficient foaming of the fluid (i.e. at least about 50% gas, preferably at least about 70% gas, more preferably at least about 95% gas, by volume under reservoir temperature and pressure). Preferably, the surfactant comprises a siloxane, more preferably a polyether-modified polysiloxane, such as is commercially available under the name Tegostab B8404 (Goldschmidt).

The identity of the gas is not critical. Preferably, the gas is inexpensive, non-toxic, and incapable of cross-reactions with the other components of the composition fluid. The gas can be nitrogen, water vapor, oxygen, carbon dioxide, air, argon, or neon, among others. Preferably, the gas is nitrogen.

In this embodiment, the consolidation fluid can be generated at any time prior to injection of the fluid into the formation, preferably shortly before injection. Typically, the resin, curing agent, surfactant, and optional catalyst are combined into a fluid. The gas is then combined with the fluid, and the gas/fluid mixture passes through a foam generator (e.g. a section of pipe packed with a mixing device, such as steel wool) to form the foamed consolidation fluid with at least about 50% gas by volume. Preferably, the foamed consolidation fluid is at least about 70% gas by volume, and more preferably, is at least about 95% gas by volume. The foamed consolidation fluid can then be injected into the formation.

In another preferred embodiment, the consolidating fluid comprises an oil-in-water-in-oil emulsion, which may herein be called a "multiple emulsion," wherein the internal oil phase comprises a catalyst, the water acts as a barrier between the oil phases, and the external oil phase comprises a curing agent (if any) and the resin; wherein the emulsion further comprises a water soluble, high hydrophilic/lipophilic balance (HLB) emulsifier and a water soluble, low HLB emulsifier. In an alternative, the internal oil phase comprises the catalyst and the resin, and the external oil phase comprises the curing agent. This alternative is not preferred if the resin comprises a furan, as the presence of the furan and a catalyst in the same phase may bring about premature autopolymerization of the furan. In yet another alternative, the internal oil phase comprises the catalyst and the curing agent (if any), and the external oil phase comprises the resin. Optionally, in any alternative, an oil-wetting agent, a coupling agent, or both can be included in any appropriate phase of the emulsion.

The catalyst, resin, and curing agent are as described above. The water soluble, high HLB emulsifier can be selected, for example, from Tween 40, Tween 80, Synperonic PE/F127, Brij 35, Brij 58, or Triton X100. The water soluble, low HLB emulsifier can be selected, for example, from Span 80, lecithin, Hypomer A60, or Abil EM90. Preferably, the high HLB emulsifier is Tween 80, and the low HLB emulsifier is Hypomer A60.

In this embodiment, use of a 2-(2-methoxyethoxy)ethanol as a diluent for the resin or curing agent is inappropriate, as the compound functions as a cosolvent and prevents formation of the multiple emulsion. Xylene, or other hydrophobic organic solvents, can be used as diluent in this embodiment to allow formation of the multiple emulsion.

The consolidating fluid of this embodiment is prepared by first generating the primary emulsion of the internal oil phase in the water phase. The internal oil phase is prepared by diluting the catalyst (or catalyst and resin) in an appropriate oil, such as mineral oil. To adjust the concentration of catalyst (or catalyst and resin) in the final consolidating fluid, the dilution by mineral oil can be varied in the internal oil phase and a preselected volume of the internal oil phase can be used. Alternatively, the dilution by mineral oil can be to a preselected concentration of catalyst (or catalyst and resin) in the internal oil phase, and the volume of the internal oil phase in the final consolidating fluid can be varied.

The water phase is prepared by dissolving the high HLB emulsifier and any other desired additives in water. The dissolving can be aided by the use of heat, stirring, or both.

The primary emulsion of the internal oil phase in the water phase is prepared by slow addition of the internal oil phase into the water phase under stirring, such as by a paddle mixer at a speed of about 1200 rpm to about 1400 rpm. A typical primary emulsion comprises about 62.5% of the water phase and about 37.5% of the internal oil phase, the internal oil phase comprising droplets with a size in the range of about 5 microns to about 15 microns. Such a typical primary emulsion preferably is stable for at least about 14 days, if not longer. The primary emulsion can be prepared either at a plant and shipped to the field, or prepared in the field, prior to preparation of the multiple emulsion.

The multiple emulsion is formed by combining the primary emulsion and the external oil phase. The external oil phase is prepared by dissolving the curing agent (or a mixture of the resin and curing agent) (75%/25% by weight) with an oil-based solution of the low HLB emulsifier (about 4% emulsifier). The primary emulsion is then slowly added to the external oil phase under stirring, such as by a paddle mixer at about 400 rpm to about 600 rpm. A typical multiple emulsion comprises about 81% external oil phase and about 19% of the primary emulsion. The primary emulsion comprised droplets with a size of about 30 microns to about 150 microns.

The multiple emulsion so formed is typically stable for about 2 hr before the phases separate, and so should be used for injection shortly after its formation. Agitation of the multiple emulsion to prevent phase separation is not recommended, as this would lead to disruption of the droplets of the primary emulsion and subsequent catalysis of the setting reaction.

Injection of the Consolidating Fluid

After the consolidating fluid is prepared, it can be injected into a formation to consolidate the formation.

Though not to be bound by theory, it is believed that the self-diverting consolidating fluids of the present invention work by reducing the mobility of the fluids in the regions of the formation into which they first flow. For example, in the case of the emulsion, the consolidating fluid flows into the rock, which strips the emulsion, releases the catalyst, and speeds setting of the fluid. This inhibits the further entry of fluid into this region of the formation, and diverts it to other regions.

Techniques for injection of consolidating fluids are well known in the art. Formations for which consolidation is desirable include sand, sandstone, and limestone, among others.

The consolidating fluids of the present invention are especially useful for formations comprising at least a first layer and a second layer, wherein the permeability ratio (the ratio of the permeability of the first layer to the permeability of the second layer) is greater than 1. The permeabilities of the layers can be readily determined by one of ordinary skill in the art. By "layers" are meant portions of the formation which have different permeabilities. The layers can be vertically displaced, horizontally displaced, or a combination of the two. By "layers" are also meant portions of a single geologic formation that, owing to, e.g., a coarsening upward or coarsening downward of a sandstone, have different permeabilities.

The foamed consolidation fluid described above can be prepared by passing the consolidating fluid through a foam generator, such as a section of pipe packed with steel wool.

After injection, during which the consolidation fluid permeates the formation, the fluid sets to consolidate the formation. In the case where the formation comprises at least a first layer and a second layer, wherein the permeability ratio is greater than 1, the self-diverting consolidation fluid presumably can enter the second layer to a greater extent than a conventional consolidation fluid, and lead to greater consolidation of the second layer. In this case, self-diversion will be readily observed as a reduction in the production of small particulates, relative to that seen when consolidating fluids previously known in the art are used in the formation.

After consolidation, hydrocarbons can be produced from the formation using well-known methods. The consolidated formation may retain sufficient permeability that the flow of hydrocarbons from the consolidated formation into the wellbore is adequate for efficient production. However, the consolidated formation may have very low permeability, and will require further treatment, such as fracturing, before hydrocarbon production can commence. Fracturing or other treatment techniques are well known in the art.

EXAMPLES

Example 1

Diversion by Foaming the Resin

Experiments were conducted on sand packs of various permeabilities, and also on Clashach and Birchover sandstone cores. The materials used and their permeabilities are as follows:

| Material | Permeability (Darcy) |
|---|---|
| Ballotini 180–300 µm sand | 55. |
| Ballotini 45–90 µm sand | 6.3 |
| Ballotini 4–45 µm sand | 1.4 |
| Clashach sandstone | 0.6 |
| Birchover sandstone | 0.01 |

The sand packs and sandstone cores were contained in cylindrical pressure vessels lined with PTFE, in order to remove the consolidated material after curing for compressive strength testing. Pack sizes were 100 mm long and 25 mm in diameter.

The apparatus comprised a resin pump and a gas cylinder. The gas used in these experiments was nitrogen. The flow rate of nitrogen from the cylinder was set by a mass flow controller. A constant mass of nitrogen was provided per unit time, so the volumetric flow rate varied with the pressure in the apparatus. The resin and gas flows were combined and injected into the apparatus at a constant volumetric flow rate by the use of a syringe pump. The resin and gas flow passed through a foam generator (a segment of pipe packed with steel wool). The foamed resin line then split to feed foamed resin to two parallel core holders. Foamed resin that passed through each core holder was collected, either at ambient pressure or in a back pressure receiver.

At the end of the flowing period, the core holders were sealed at each end, removed from the apparatus, and placed in an oven at about 60° C., overnight, for curing of the resin. Once set, the consolidated cores were extracted from the core holders and placed in an oven at about 105° C. for 24 hr, to complete the curing process. The cured consolidated cores were then cut into approximately equal cylindrical halves, and their permeabilities and unconfined compressive strengths were measured.

A typical resin formulation used in this experiment was as follows:

| | | |
|---|---|---|
| resin | | 150 mL |
| 2-(2-methoxyethoxy)ethanol | 30–40% | |
| bisphenol A-epichlorohydrin polymer | 60–70% | |
| xylene | 1–5% | |
| curing agent | | 50 mL |
| 2-(2-methoxyethoxy)ethanol | 30–40% | |
| glycidoxypropyl trimethoxysilane | 10% | |
| 4,4-methylenedianlline | 50% | |
| catalyst | | 20 mL |
| amine phenol derivative | 84% | |
| phenol | 16% | |
| oil wetting agent | | 25 mL |
| Tegostab B8404 foaming surfactant | | 9 mL |

The resin, curing agent, catalyst, and oil wetting formulations were substantially those commercially available under the trade name Sandlock (Schlumberger), with the exception of Tegostab B8404 (Goldschmidt). Control formulations were identical, but excluded Tegostab.

One set of experiments was carried out at room temperature with discharge at atmospheric pressure. Gas and liquid flow rates were chosen to limit the pressure drop to less than about 500 psi. The volume fraction of gas was in all cases high, typically about 96%, at the start of the experiment. Flow rates of 150 mL/min at ambient pressure for the gas and 5 mL/min for the liquid were used. It should be noted that the mass flow rate of the gas was held constant; therefore, when pressure increased when the foam invaded the cores or packs, the volume fraction of the gas was reduced.

The effluent was collected onto balances to determine the relative liquid flow rates through the two cores or packs. Collection continued until foam broke through from the low permeability core. The results were as follows:

| First Medium/Second Medium | Permeability Ratio | Flow Ratio |
|---|---|---|
| Birchover/Clashach | 60:1 | 12:1 |
| 4–45/180–300 | 39:1 | 14:1 |
| 4–45/45–90 | 4.5:1 | 2.8:1 |
| 4–45/45–90 (control) | 4.5:1 | 5.1:1 |

In the control, as expected, the resin/gas formulation (unfoamed due to the lack of surfactant in the formulation) did not exhibit self-diversion. The ratio of the flow rates of the fluid through the two cores or packs was roughly that expected from the permeability ratio.

For the experimental fluid, in distinction, the foamed formulation did exhibit self-diversion. The ratio of the flow rates was lower than the permeability ratio in all experiments.

The cores or packs were then cured and cut into halves. The permeabilities of the two halves to oil were then measured. Typically, the inlet half of the core saw a permeability reduction of about 10-fold, and the outlet half of the core exhibited a permeability reduction of from about 100- to 1000-fold. The difference is presumably due to movement of the foam after the core was shut in but before the resin was set.

The unconfined compressive strengths (UCS) of the cured cores or packs were also measured. In all cases, at a depth of about 2 mm or greater into the core, the unconfined compressive strength was at least 1000 psi or more. Little variation in the UCS between the inlet and outlet halves of the core or pack was seen. The elastic strain to failure of the cores was typically about 4%.

A second set of experiments was performed at room temperature under a back pressure of 100 psi and with a liquid flow of 2.5 mL/min. Formulations were as described above. The 45–90 and 445 sand packs were used (permeability ratio 4.5:1). In two runs of the experiment, the volume of foam collected from the low permeability core was greater than that collected from the high permeability core, indicating the foamed resin formulation was self-diverting.

In summary, the Sandlock system can be successfully foamed with nitrogen when Tegostab B8404 surfactant is added to the formulation. Such a foamed formulation shows self-diversion and consolidation of sand packs or sandstone cores at permeabilities ranging from 55 to 0.01 D.

Example 2

Diversion by Multiple Emulsion

Rock cores, of Ketton limestone, Clashach sandstone, or Birchover sandstone, 25 mm in diameter by 50 mm long, were mounted in a Hassler cell and a confining pressure of 1200 psi was applied.

A multiple emulsion was prepared as described in the Detailed Description, and pumped through each core at a constant flow rate of 2.5 mL/min. A total of 10 pore volumes was pumped through each core.

The pressure required to maintain the flow rate was recorded, and the fluid that passed out of the core was inspected. The sample was then placed in an oven at 60° C. to observe any changes in resin curing time.

For the Ketton limestone (permeability 2.0 D), a stable maximum pressure of 14 psi maintained the flow rate. The fluid that passed through the core showed few multiple emulsion droplets remaining after the first few minutes of flow. The curing time of the sample was reduced by about 20% when compared with a fresh sample, but this may be due to partial premature release of the catalyst from the primary emulsion during formation of the multiple emulsion. Inspection of the front face of the core showed no evidence that the fluid was screened out.

For the Clashach sandstone, a continuous pressure increase occurred throughout the test, resulting in a final value of 220 psi. The fluid that passed through the core showed few multiple emulsion droplets remaining after the first few minutes of flow. Curing time was also reduced about 20%. A small amount of polymer was observed on the front face of the core.

For the Birchover sandstone, at the flow rate of 2.5 mL/min, the pressure immediately increased to 1200 psi when the emulsion contacted the core. Because this was roughly the same as the confining pressure of the core, the flow rate was reduced to 0.05 mL/min, which required a pressure of 760 psi to be maintained. The fluid that passed through the core was a simple emulsion with a very fine droplet size. Some polymer (more than for either the Ketton or Clashach cores) was seen on the front face of the core.

This example shows that a multiple emulsion of the present invention can be successfully injected into cores of Ketton limestone or Clashach sandstone. Fluid flow through the core ruptures droplets of the primary emulsion, which releases the catalyst and reduces the resin cure time.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A consolidating fluid comprising:

a resin;

a surfactant;

a curing agent;

a catalyst; and at least 50% by volume of a gas, wherein said curing agent comprises 4,4-methylenedianiline or a diisocyanate, and wherein said catalyst comprises an amine phenol derivative, toluene sulfonic acid, hydrochloric acid, sulfuric acid, HNO, oxalic acid, HI, maleic acid, chloroacetic acid, dichloroacetic acid, trichloroacetic acid, $H_3PO_4$, o-nitrobenzoic acid, benzoic acid, acetic acid, or adipic acid.

2. The consolidating fluid of claim 1, wherein said surfactant is a siloxane.

3. The consolidating fluid of claim 1, wherein said surfactant is a polyether-modified polysiloxane.

4. The consolidating fluid of claim 1, wherein said resin comprises bisphenol A-epichlorohydrin polymer.

5. The consolidating fluid of claim 1, wherein said fluid comprises at least about 70% by volume of a gas.

6. The consolidating fluid of claim 2 further comprising an oil-wetting agent.

* * * * *